United States Patent [19]

Bedell et al.

[11] Patent Number: 5,705,211

[45] Date of Patent: Jan. 6, 1998

[54] METHOD AND APPARATUS FOR CARBONATING A BEVERAGE

[76] Inventors: Daniel J. Bedell, 205 SW. 97th Ave.; John Smith-Hill, 135 SW. 97th Ave., both of Portland, Oreg. 97225

[21] Appl. No.: 726,064

[22] Filed: Oct. 3, 1996

[51] Int. Cl.$^6$ .................. A23L 2/00; A23L 2/52
[52] U.S. Cl. .................. 426/112; 426/8; 426/124; 426/131; 426/394; 426/397; 426/398; 426/477; 422/28; 99/323.1
[58] Field of Search .................. 426/8, 13, 477, 426/397, 398, 394, 392, 322, 324, 326, 112, 124, 131; 422/28; 435/288.1; 99/323.1, 323.2, 276, 277; 261/DIG. 7

[56] References Cited

U.S. PATENT DOCUMENTS

| | | | |
|---|---|---|---|
| 2,008,131 | 7/1935 | Dieck et al. | 426/322 |
| 2,040,806 | 5/1936 | Feigl | 426/322 |
| 2,694,641 | 11/1954 | Atwood et al. | 426/8 |
| 2,992,974 | 7/1961 | Belcove et al. | 435/288.1 |
| 3,092,552 | 6/1963 | Romans | 426/322 |
| 3,112,201 | 11/1963 | Saez | 426/8 |
| 3,404,987 | 10/1968 | Koolstra et al. | 426/322 |
| 3,722,188 | 3/1973 | Cullen | 426/124 |
| 4,057,649 | 11/1977 | Bensalem | 426/322 |
| 4,421,235 | 12/1983 | Moriya | 426/398 |
| 4,423,670 | 1/1984 | Tenison | 426/477 |
| 4,695,468 | 9/1987 | Boston | 426/477 |
| 5,019,410 | 5/1991 | Pors et al. | 426/13 |
| 5,573,797 | 11/1996 | Wilholt | 426/324 |

FOREIGN PATENT DOCUMENTS 1484786  9/1977  United Kingdom .................. 426/477

*Primary Examiner*—Steven Weinstein
*Attorney, Agent, or Firm*—Smith-Hill and Bedell

[57] ABSTRACT

A beverage containing sugar is carbonated by first placing the beverage and a small amount of yeast in a bottle. A small paper disk impregnated or coated with a yeast-killing sterilizing agent such as sodium metabisulfite is attached to the underside of a bottle cap. The bottle is then sealed with the cap and stored in an upright position with the bottle cap holding the disk above the beverage. After the yeast has fermented a sufficient amount of the sugar to adequately carbonate the beverage, the bottle is shaken for a time to allow the beverage to rinse the yeast-killing agent from the disk. As the agent mixes with the beverage, it kills the yeast in the bottle, thereby terminating fermentation of the sugar.

9 Claims, 1 Drawing Sheet

METHOD AND APPARATUS FOR CARBONATING A BEVERAGE

BACKGROUND OF THE INVENTION

1. Field of the Invention

The present invention relates in general to a method for carbonating a beverage containing sugar.

2. Description of Related Art

Commercial producers typically carbonate a sweet beverage such as root beer, ginger beer, cider, wine and the like by placing it in a closed pressure tank and then injecting carbon dioxide into the tank. The carbonated beverage is then transferred under pressure from the tank to small bottles.

Lacking such carbonating equipment, amateur producers typically carbonate a sweet beverage by mixing a small amount of yeast with the beverage and placing the mixture in a capped bottle. The bottle is then stored in a warm place to allow the yeast to ferment some of the sugar, thereby to carbonate the beverage. After the yeast has had sufficient time (typically a day or so) to adequately carbonate the beverage, the bottle is refrigerated. Since yeast activity is retarded at low temperatures, refrigeration can stop the fermentation process, thereby preventing the yeast from over-carbonating the beverage.

While this "bottle conditioning" method of carbonation is simple, it has drawbacks. The bottles required to accommodate a typical batch (usually several gallons) of a beverage use up a lot of refrigerator space. More importantly, although yeast activity is retarded at normal refrigerator temperature, not all yeasts may become totally inactive at typical refrigerator temperatures. Thus carbonation often continues, though at a slower rate, after the bottles are refrigerated. Even when a yeast becomes totally inactive at normal refrigerator temperatures, fermentation can restart when refrigerator temperature rises during periodic defrost cycles or when the refrigerator stops working for some reason. Such continued fermentation after refrigeration can produce an overcarbonated beverage and exploding bottles. Thus experienced amateur producers become apprehensive when their refrigerated handiwork is not promptly consumed.

One could stop fermentation by opening the bottle after the beverage is sufficiently carbonated, dumping a sterilizing agent such as sodium metabisulfite powder into the beverage and then resealing the bottle. However opening a warm bottle of carbonated beverage and dumping a powder into the beverage can cause much of the dissolved carbon dioxide to escape, thereby reducing carbonation and possibly turning the beverage into a foaming geyser.

What is needed is an easy and reliable method for permanently stopping fermentation of a beverage within a sealed container without opening or refrigerating the container.

SUMMARY OF THE INVENTION

In accordance with the present invention, a beverage including sugar dissolved in water is carbonated by first placing the beverage and a small amount of yeast in a bottle. A small paper disk impregnated or coated with a sterilizing agent such as sodium metabisulfite is attached to the underside of a bottle cap. The bottle is then capped and stored in an upright position with the bottle cap holding the disk above the beverage. After the yeast has fermented a sufficient amount of sugar to adequately carbonate the beverage, the bottle can be shaken or inverted for a time to allow the beverage to rinse the yeast-killing agent out of the disk. As the agent mixes with the beverage, it kills the yeast in the bottle, thereby permanently terminating fermentation.

It is accordingly an object of the invention to provide a method and apparatus for carbonating a beverage.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWING(S)

FIG. 1 is an exploded sectional view of an apparatus in accordance with the present invention for carbonating a liquid; and FIG. 2 is a sectional view of the apparatus of FIG. 1 in an inverted position.

DESCRIPTION OF THE PREFERRED EMBODIMENT(S)

Figure 1:
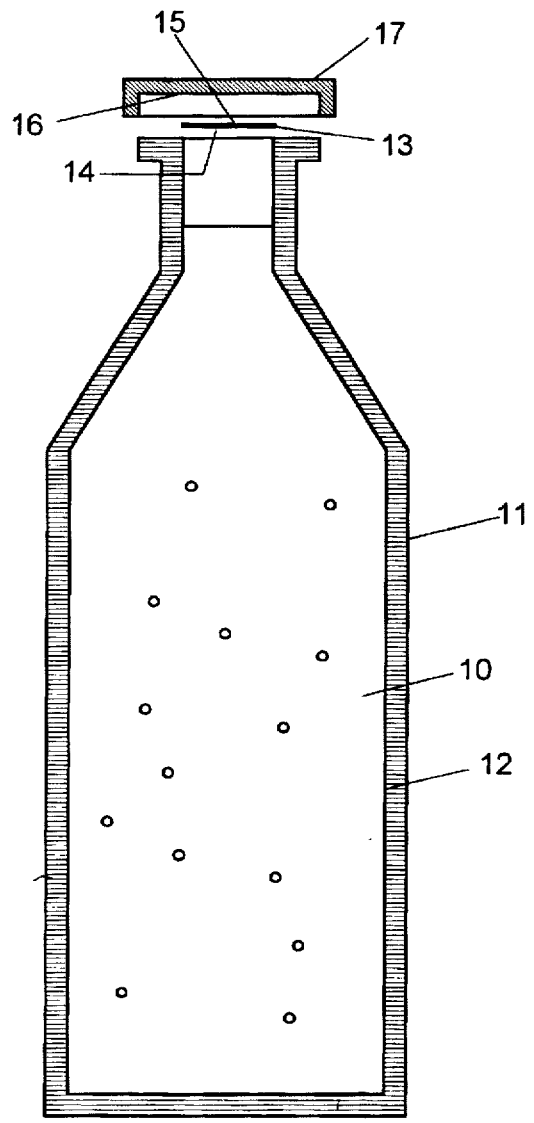
Figure 2:
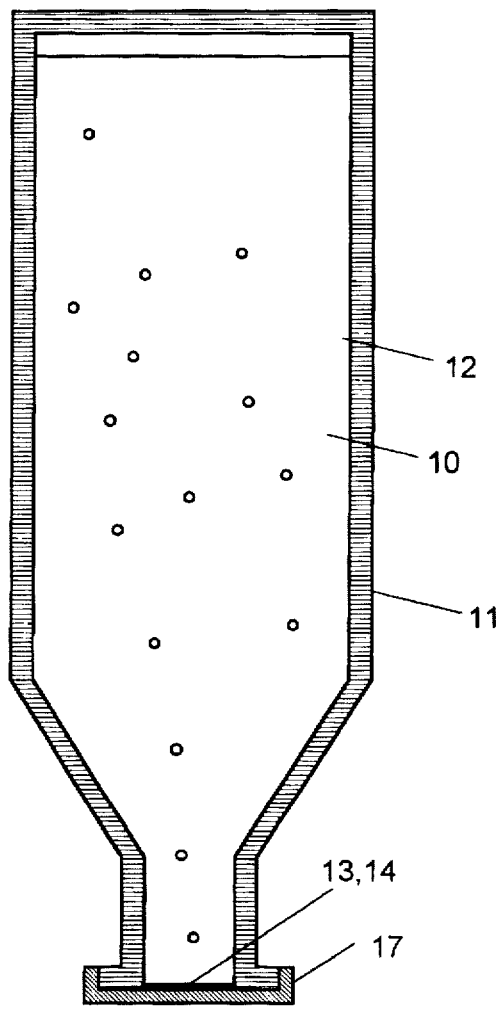

FIG. 1 illustrates an apparatus for carbonating a sweet beverage 10 or other liquid containing sugar and water such as root beer, cider or sweet wine. Beverage 10 is placed in a container, bottle 11, along with a small amount of yeast 12, an organism which ferments sugar to produce carbon dioxide. A small paper substrate 13 is impregnated with or coated with a yeast-killing sterilizing agent 14 such as sodium metabisulfite. Substrate 13 has an upper side 15 coated with an adhesive for attaching the disk to an underside 16 of a bottle cap 17. Bottle 11 is sealed by bottle cap 17 and stored in an upright position so that bottle cap 17 holds agent 14 above and apart from beverage 10. At a selected time after yeast 12 has fermented a sufficient amount of sugar in beverage 10 to adequately carbonate beverage 10 (suitably a day or so), bottle 11 is shaken or inverted as shown in FIG. 2 for a time to allow liquid 10 to rinse the sterilizing agent 14 from substrate 13. As the sterilizing agent 14 diffuses into and mixes with beverage 10, it kills yeast 12 thereby terminating the fermentation process.

While the forgoing specification has described preferred embodiment(s) of the present invention, one skilled in the art may make many modifications to the preferred embodiment without departing from the invention in its broader aspects. For example disk 13 may be attached alternatively to an inner surface of bottle 11 above beverage 10. The appended claims therefore are intended to cover all such modifications as fall within the true scope and spirit of the invention.

What is claimed is:

1. An apparatus for carbonating a beverage containing sugar and water, the apparatus comprising:

a sealed container holding the beverage, yeast mixed with said beverage held in said container for fermenting said sugar so as to carbonate said beverage, a yeast-killing agent, and means for holding said yeast-killing agent within said sealed container apart from said beverage when said beverage is in a first position relative to said container so that said yeast is not affected by said yeast-killing agent and for allowing said yeast-killing agent to mix with said beverage so as to kill said yeast when said beverage is in a second position relative to said container.

2. The apparatus in accordance with claim 1 wherein said means for holding comprises a substrate impregnated with said yeast-killing agent.

3. The apparatus in accordance with claim 2 wherein said container comprises an inner surface and wherein said means for holding comprises means for attaching said substrate to said inner surface of said container.

4. The apparatus in accordance with claim 1 wherein said means for holding comprises a substrate coated with said yeast-killing agent.

5. The apparatus in accordance with claim 4 wherein said container comprises an inner surface and wherein said means for holding comprises means for attaching said substrate to said inner surface of said container.

6. The apparatus in accordance with claim 1 wherein said sealed container comprises a bottle and a cap sealing said bottle and wherein said means for holding comprises means for attaching said yeast-killing agent to said cap.

7. A method for killing yeast in a beverage within a sealed container at a selected time after the container is sealed, the method comprising the steps of:

attaching a yeast-killing agent to an inner surface of said container before the container is sealed while the container is positioned such that the agent is held away from the beverage within the container so that said yeast is not affected by said yeast-killing agent, then sealing the container, and thereafter repositioning said sealed container at said selected time so that said liquid contacts said yeast-killing agent such that said yeast is killed in said sealed container.

8. A method for carbonating a beverage containing sugar and water, the method comprising the steps of:

placing a mixture of the beverage and yeast into a container and orienting said container so that the beverage and yeast mixture resides in a first position within said container;

placing a means for holding a yeast-killing agent within said container, said means for holding containing said yeast-killing agent and maintaining said yeast-killing agent apart from said beverage when said beverage is in said first position relative to said container so that said yeast is not affected by said yeast-killing agent, said means for holding allowing said yeast-killing agent to contact and mix with said beverage when said beverage is moved to a second position relative to said container;

then sealing the container;

allowing said yeast in said sealed container sufficient time to ferment said sugar so as to carbonate said beverage; and thereafter orienting said sealed container so that the beverage moves to said second position to mix with said yeast-killing agent such that said yeast-killing agent kills the yeast mixed with said beverage.

9. The method in accordance with claim 8 wherein the step of placing means for holding a yeast-killing agent within said container comprises the step of attaching said means for holding to an inner surface of said container.

* * * * *